United States Patent
Yang

(10) Patent No.: US 7,753,397 B2
(45) Date of Patent: Jul. 13, 2010

(54) PIVOTAL BASE FOR A CANOPY FRAME

(75) Inventor: Cheng-Fan Yang, Tainan Hsien (TW)

(73) Assignee: Link Treasure Limited, Tortola (VG)

( * ) Notice: Subject to any disclaimer, the term of this patent is extended or adjusted under 35 U.S.C. 154(b) by 433 days.

(21) Appl. No.: 11/953,391

(22) Filed: Dec. 10, 2007

(65) Prior Publication Data

US 2008/0136212 A1    Jun. 12, 2008

(30) Foreign Application Priority Data

Dec. 13, 2006    (TW) .............................. 95222013 U

(51) Int. Cl.
- *B62B 3/00* (2006.01)
- *B62B 7/00* (2006.01)
- *B62B 9/12* (2006.01)
- *B62B 9/14* (2006.01)

(52) U.S. Cl. ....................... 280/642; 280/647; 280/650; 280/658; 280/47.38

(58) Field of Classification Search ................. 280/642, 280/643, 644, 647, 650, 657, 658, 47.25, 280/47.38, 47.4, 47.41
See application file for complete search history.

(56) References Cited

U.S. PATENT DOCUMENTS 4,378,946 A    4/1983    Voytko

| | | | |
|---|---|---|---|
| 6,139,046 A * | 10/2000 | Aalund et al. | 280/642 |
| 6,877,761 B2 * | 4/2005 | Hsia | 280/642 |
| 2006/0061066 A1 * | 3/2006 | Tan | 280/642 |
| 2007/0069505 A1 * | 3/2007 | Li | 280/642 |
| 2008/0088116 A1 * | 4/2008 | Den Boer | 280/650 |

* cited by examiner

*Primary Examiner*—Hau V Phan
*Assistant Examiner*—John R Olszewski
(74) *Attorney, Agent, or Firm*—Morris, Manning & Martin LLP; Tim Tingkang Xia

(57) ABSTRACT

A pivotal base is adapted for detachably connecting a canopy frame to a stroller. The pivotal base comprises a connector, a first pivotal connector and a second pivotal connector. Wherein the connector of the pivotal base has a plug for connecting with the stroller, and a snap wall formed with a toothed inner surface; the first pivotal connector has a first connecting portion for connecting with a canopy brace, and a toothed portion pivotally inserted and snapped by the toothed inner surface in a plurality of fixed angle positions; and the second pivotal connector has a second connecting portion for connecting with another canopy brace, and a toothed portion pivotally inserted and snapped by the toothed inner surface in a plurality of fixed angle positions.

12 Claims, 3 Drawing Sheets

PIVOTAL BASE FOR A CANOPY FRAME

BACKGROUND OF THE INVENTION

1. Field of the Invention

This invention relates to a pivotal base. More specifically, this invention relates to a pivotal base having a snap wall formed with a toothed inner surface for pivotally engaging with a pair of canopy braces in a plurality of angle positions.

2. Description of the Related Art

Stroller adapted for transporting a baby or infant passenger. When travelling outdoors, a canopy is needed for shielding the sun shine.

Typically, for reducing the volume occupancy, the canopy is designed to be foldable and extendable. U.S. Pat. No. 4,378,946 to Voytko et al. discloses a structure of canopy including a U-like bent canopy brace which has two ends pivot to the push arm of a stroller, and carries the canopy either extending or folding.

The pivot base for connecting the canopy brace with multi-angle positioning function has been commonly utilized on the stroller; however, the structure of such a pivot base is still too complex and costly to the manufacturer.

SUMMARY OF THE INVENTION

The object of the present is to provide simplified structure of the pivot base for ease in assembly. The canopy frame including a first canopy brace, a second canopy brace and a canopy supported by said first and second canopy braces.

The pivotal base according to the present invention may comprise a connector, a first pivotal connector and a second pivotal connector. Wherein the connector of the pivotal base has a plug for connecting with the stroller, and a snap wall formed with a toothed inner surface; the first pivotal connector has a first connecting portion for connecting with the first canopy brace, and a toothed portion pivotally inserted and snapped by the toothed inner surface in a plurality of fixed angle positions; and the second pivotal connector has a second connecting portion for connecting with the second canopy brace, and a toothed portion pivotally inserted and snapped by the toothed inner surface in a plurality of fixed angle positions.

Additional features and advantages of the invention will be set forth in the description to follow, and in part will be apparent from the description, or may be learned by practice of the invention. The objectives and other advantages of the invention will be realized and attained by the structure particularly pointed out in the written description and claims as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
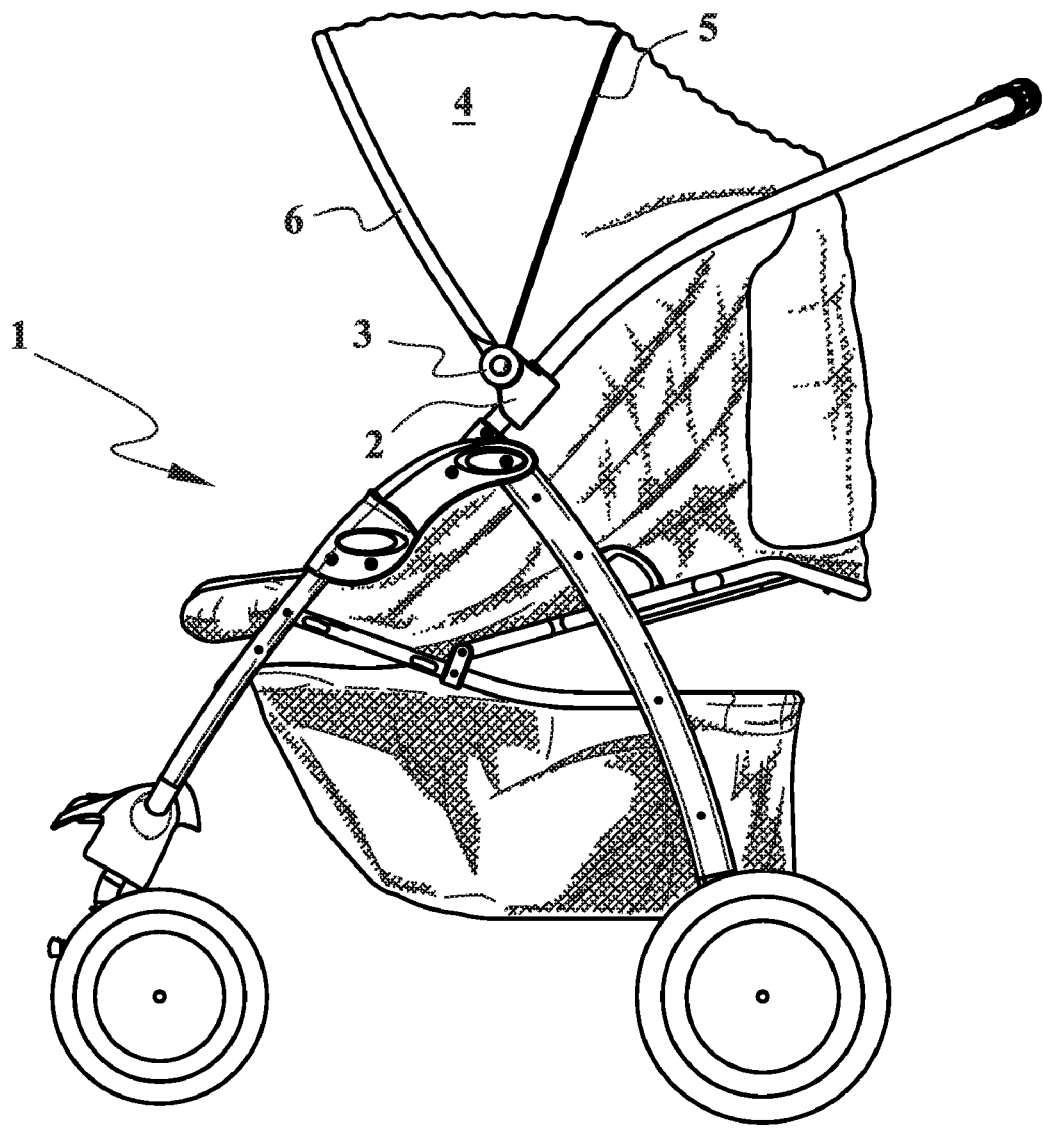
FIG. 1 is a schematic side view showing a canopy with two canopy brace being connected to a stroller by a pivotal base embodiment according to the present invention.
Figure 2:
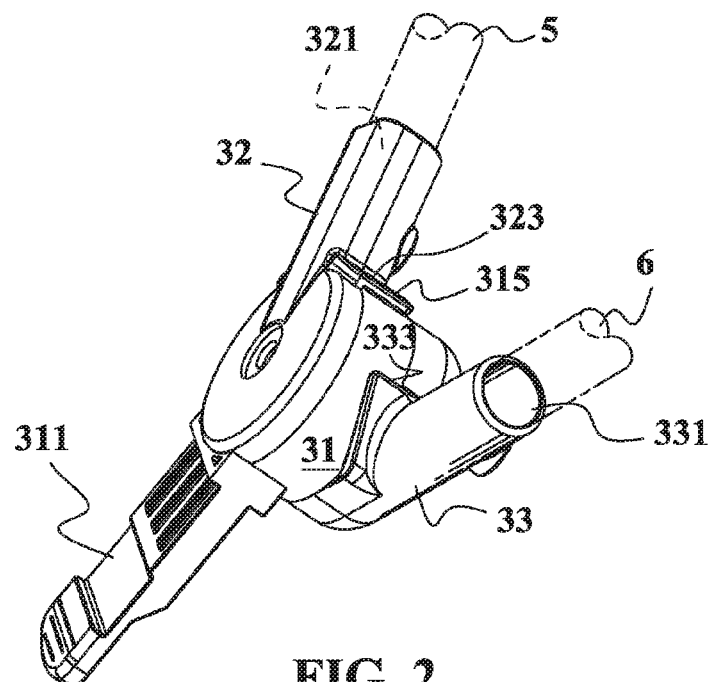
FIG. 2 is a perspective view showing the embodiment of the pivotal base.
Figure 3:
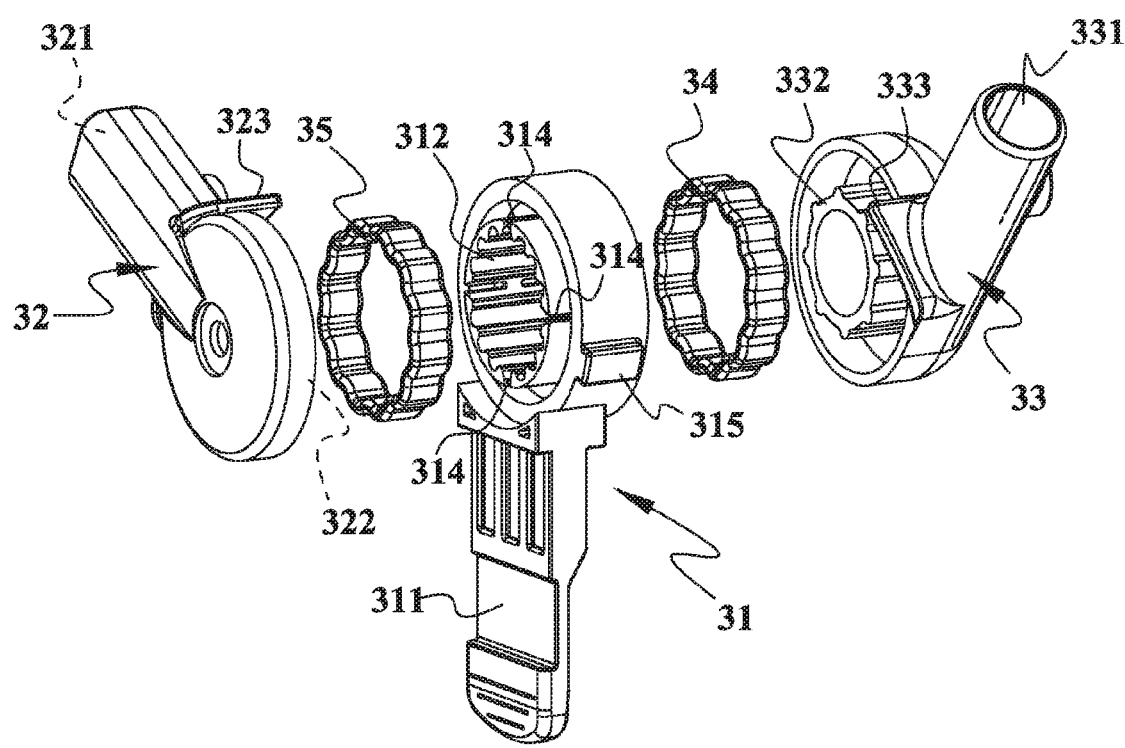
FIG. 3 is an exploded perspective view showing the embodiment of the pivotal base.
Figure 4:
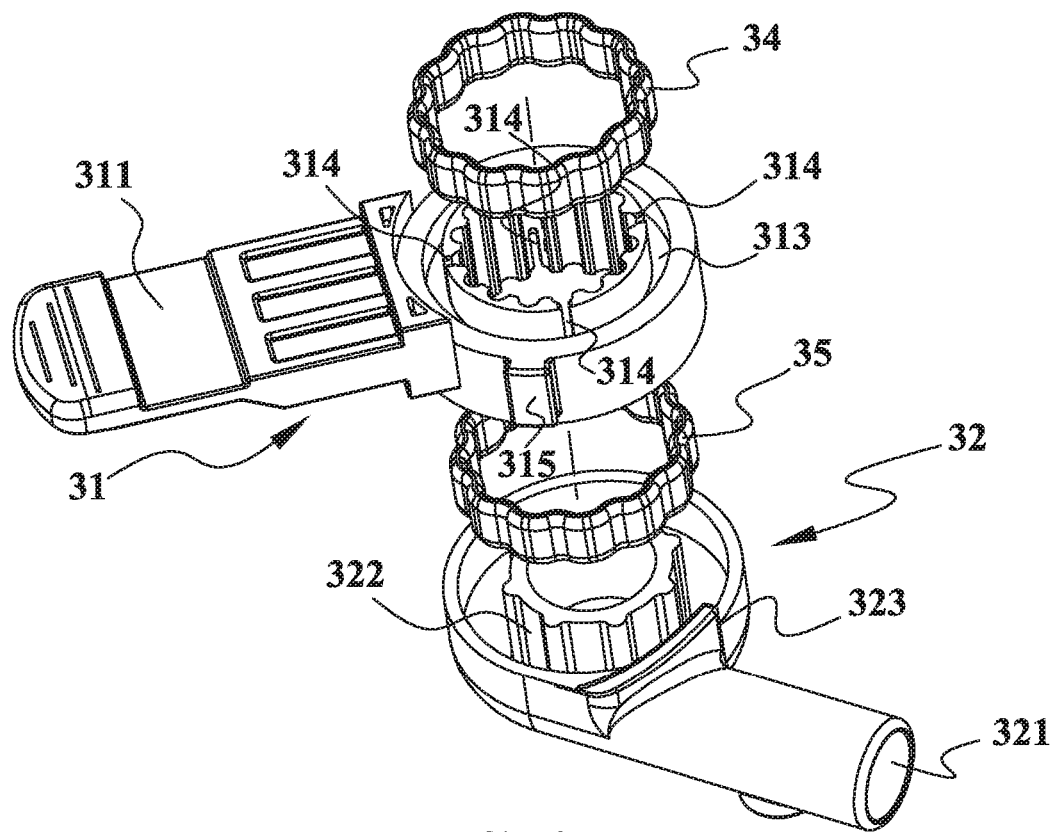
FIG. 4 is an exploded perspective view showing the first pivotal connector of the pivotal base in an opposite direction.
Figure 5:
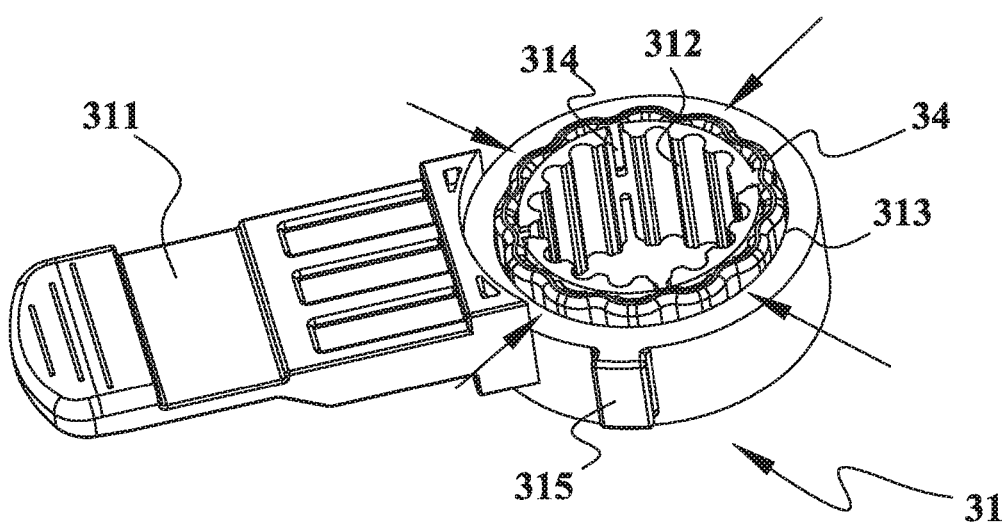
FIG. 5 is an exploded perspective view of the second pivotal connector of the pivotal base.

Referring to FIG. 1, a pivotal base 3 according to the present invention is adapted to support and connect a canopy 4 which has a first canopy brace 5 and a second canopy brace 6 for selectively shielding an infant passenger in a stroller 1.

A connecting base 2 may be mounted on the stroller 1 for detachably receiving and connecting with the pivotal base 31. For instance, the connecting base 2 may have one lower end mounted on the push bar, and an upper end formed with a socket for detachably receiving a plug 311 of the pivotal base 3.

Referring to FIGS. 2 to 5, the pivotal base 31 includes a connector 31, a first pivotal connector 32 and a second pivotal connector 33.

The connector 31 has a plug 311 for connecting with the stroller 1, and a snap wall 312 formed with a toothed inner surface. The snap wall 312 extends outwardly on both sides in an axial direction substantially perpendicular to the plug 311.

The first pivotal connector 32 has a first connecting portion 321 for connecting with the first canopy brace 5, and a toothed portion 322 pivotally inserted to and snapped by the toothed inner surface of snap wall 312 in a plurality of fixed angle positions.

Similarly, the second pivotal connector 33 also has a second connecting portion 331 for connecting with the second canopy brace 6, and a toothed portion 332 adapted to be pivotally inserted and snapped by the toothed inner surface of the snap wall 312 in a plurality of fixed angle positions that permits the canopy 4 selectively extended and kept in a plurality of positions.

It would be appreciated; the snap wall 312 can be formed with a plurality of notches 314 that facilitate the expansion of the snap wall 312 while the toothed portion 322 or 332 is forced to rotate against the snap of the toothed inner surface.

For enhance the snapping force of the snap wall 312, a first elastic ring 35 and a second elastic ring 34 are preferably sleeved on the periphery of the snap wall 312 for biasing said snap wall 312 inwardly.

The snap wall 312 is formed with a pair of annual spaces 313 along the periphery thereof for receiving a pair of elastic rings 34 and 35 for biasing the snap wall 312 inwardly. The elastic ring is substantially a ring body made of a material which has lower size variety in different temperatures, such as TPR (Thermplastic Rubber) or some other material which having similar physical characters.

The connectors 31 may have formed with a protruded portion 315 for stop and limiting the rotation range of the first and second connectors 32 and 33. The first connector 32 may has formed with a first protruded edge 323 extended laterally for contacting or bumping against the protruded portion 315 so as to stop and limiting the rotation range thereof. In the same way, the second connector 33 may also has formed with a second protruded edge 333 that extended laterally for contacting or bumping against the protruded portion 315 so as to stop and limiting the rotation range thereof.

The first and second connectors 32 and 33 may be pivotally connected to each other by a connecting element, such as a screw, a shaft, a pin, a rivet or the like, passing through the center of the snap wall 312 of the connector 31. By this way, the simplified assembly of the pivotal base according to the present invention is then accomplished.

It will be apparent to those skilled in the art that various modifications and variations can be made in the infant carrier, stroller, and base system of the present invention without departing from the spirit or scope of the invention. Thus, it is intended that the present invention cover the modifications and variations of this invention provided they come within the scope of the appended claims and their equivalents.

What is claimed is:

1. A pivotal base for connecting a canopy frame to a stroller, the canopy frame including a first canopy brace, a second canopy brace and a canopy supported by said first and second canopy braces; the pivotal base comprising:
    a connector, having a plug for connecting with the stroller, and a snap wall formed with a toothed inner surface;
    a first pivotal connector, having a first connecting portion for connecting with the first canopy brace, and a toothed portion pivotally inserted and snapped by the toothed inner surface in a plurality of fixed angle positions; and
    a second pivotal connector, having a second connecting portion for connecting with the second canopy brace, and a toothed portion pivotally inserted and snapped by the toothed inner surface in a plurality of fixed angle positions.

2. The pivotal base of the claim 1, wherein the snap wall is formed with a plurality of notches for facilitating the expansion thereof when the pivotal connectors are rotating therein.

3. The pivotal base of the claim 2, further includes a pair of elastic rings both are sleeved on the snap wall for biasing said snap wall inwardly.

4. The pivotal base of the claim 2, wherein the snap wall is formed with a pair of annual spaces along the periphery thereof for receiving a pair of elastic rings for biasing the snap wall inwardly.

5. The pivotal base of the claim 4, wherein the first and second connectors are snapped by the toothed inner surface in a position while the snap wall is biased by the pair of elastic rings inwardly.

6. The pivotal base of the claim 4, wherein the elastic ring is a ring made of a material having low size variety in different temperatures, such as TPR (Thermplastic Rubber).

7. The pivotal base of the claim 1, wherein the connector has a protruded portion for stop and limiting the rotation range of the first and second connectors.

8. The pivotal base of the claim 1, wherein the first connector has a first protruded edge for stopping and limiting the rotation range thereof.

9. The pivotal base of the claim 1, wherein the second connector has a second protruded edge for stopping and limiting the rotation range thereof.

10. The pivotal base of the claim 1, wherein the plug of the connector is adapted for inserting with a socket mounted on the stroller.

11. The pivotal base of the claim 10, wherein the plug detachably connected with the stroller by way of the socket.

12. The pivotal base of the claim 1, wherein the first and second connectors are pivotably connected to each other by a connecting element passing through the center of the snap wall 31 of the connector 31.

* * * * *